No. 817,835. PATENTED APR. 17, 1906.
J. H. CROSKEY.
APPARATUS FOR MANUFACTURING GLASS ARTICLES.
APPLICATION FILED MAY 10, 1905.
3 SHEETS—SHEET 1.
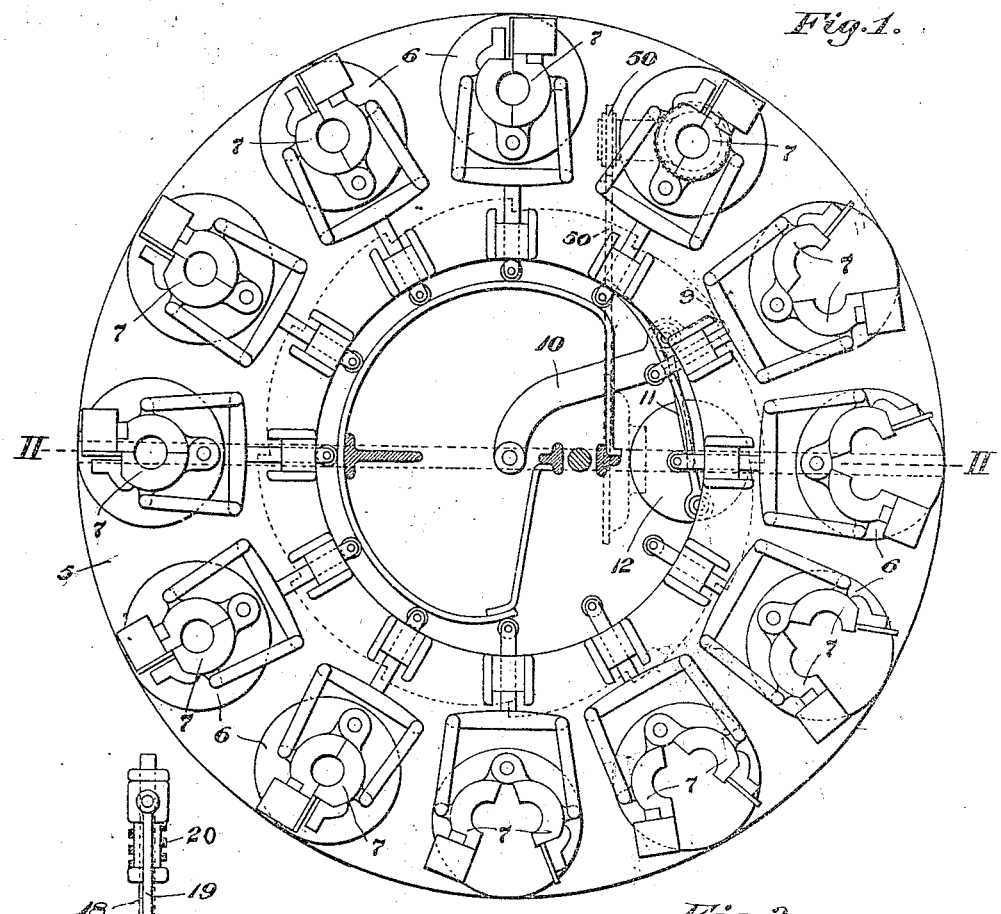
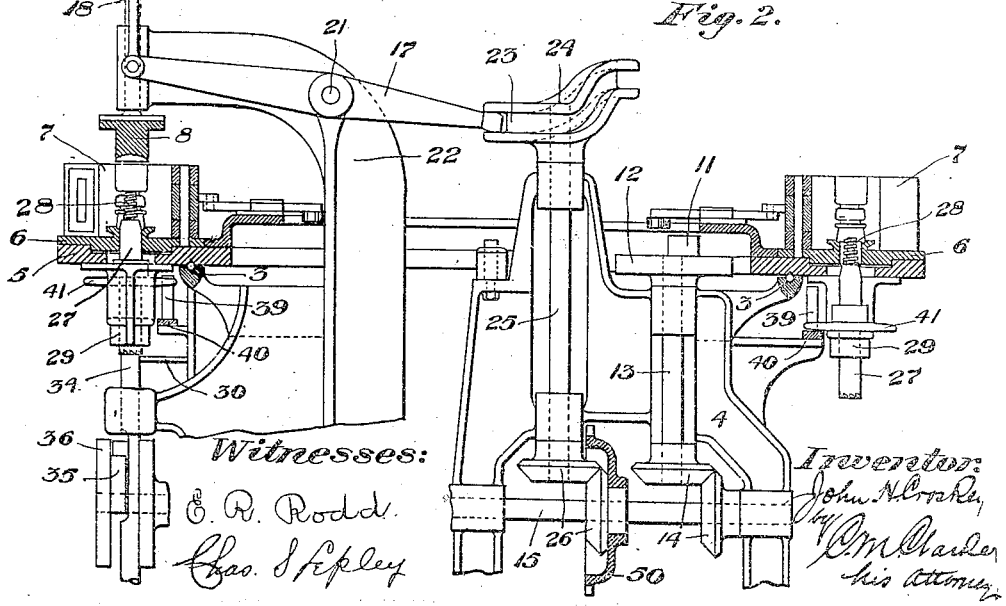
Witnesses:
E. R. Rodd.
Chas. S. Ripley.
Inventor:
John H. Croskey,
by P. M. Clarke,
his attorney.

No. 817,835. PATENTED APR. 17, 1906.
J. H. CROSKEY.
APPARATUS FOR MANUFACTURING GLASS ARTICLES.
APPLICATION FILED MAY 10, 1905.
3 SHEETS—SHEET 2.
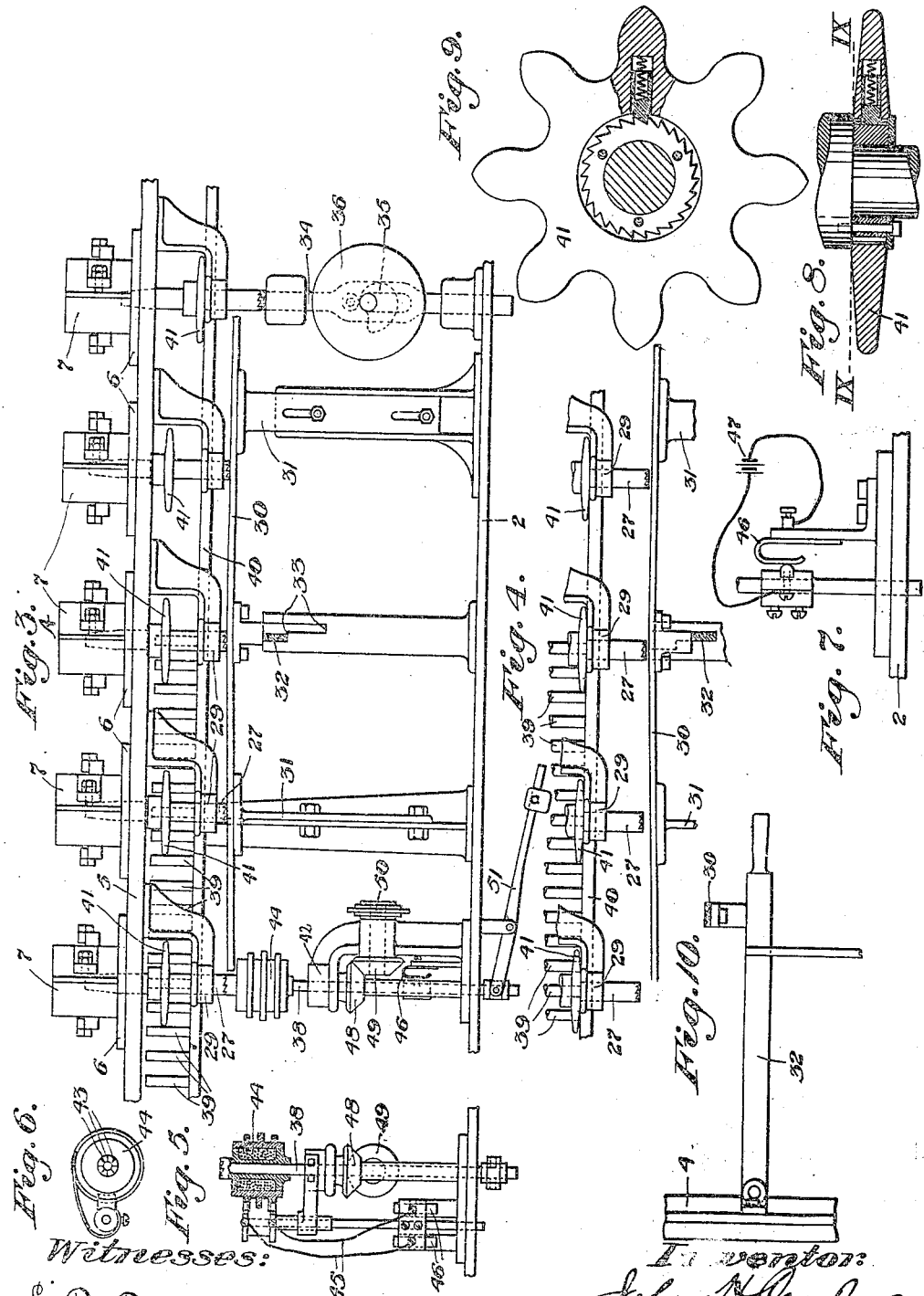
Witnesses:
E. R. Rodd.
Chas. Shipley.
Inventor:
John H. Croskey
by D. M. Clarke
his Attorney No. 817,835. PATENTED APR. 17, 1906.
J. H. CROSKEY.
APPARATUS FOR MANUFACTURING GLASS ARTICLES.
APPLICATION FILED MAY 10, 1905.

3 SHEETS—SHEET 3.

Witnesses:
E. R. Rodd.
Chas. S. Lipley.

Inventor:
John H. Croskey
by C. M. Clarke
his Attorney

UNITED STATES PATENT OFFICE.

JOHN H. CROSKEY, OF PITTSBURG, PENNSYLVANIA, ASSIGNOR TO DUQUESNE GLASS COMPANY, OF PITTSBURG, PENNSYLVANIA, A CORPORATION OF PENNSYLVANIA.

APPARATUS FOR MANUFACTURING GLASS ARTICLES.

No. 817,835.     Specification of Letters Patent.     Patented April 17, 1906.

Application filed May 10, 1905. Serial No. 259,752.

*To all whom it may concern:*

Be it known that I, JOHN H. CROSKEY, a citizen of the United States, residing at Pittsburg, in the county of Allegheny and State of Pennsylvania, have invented certain new and useful Improvements in Apparatus for Manufacturing Glass Articles, of which the following is a specification, reference being had therein to the accompanying drawings, forming part of the specification, in which—

Figure 11:
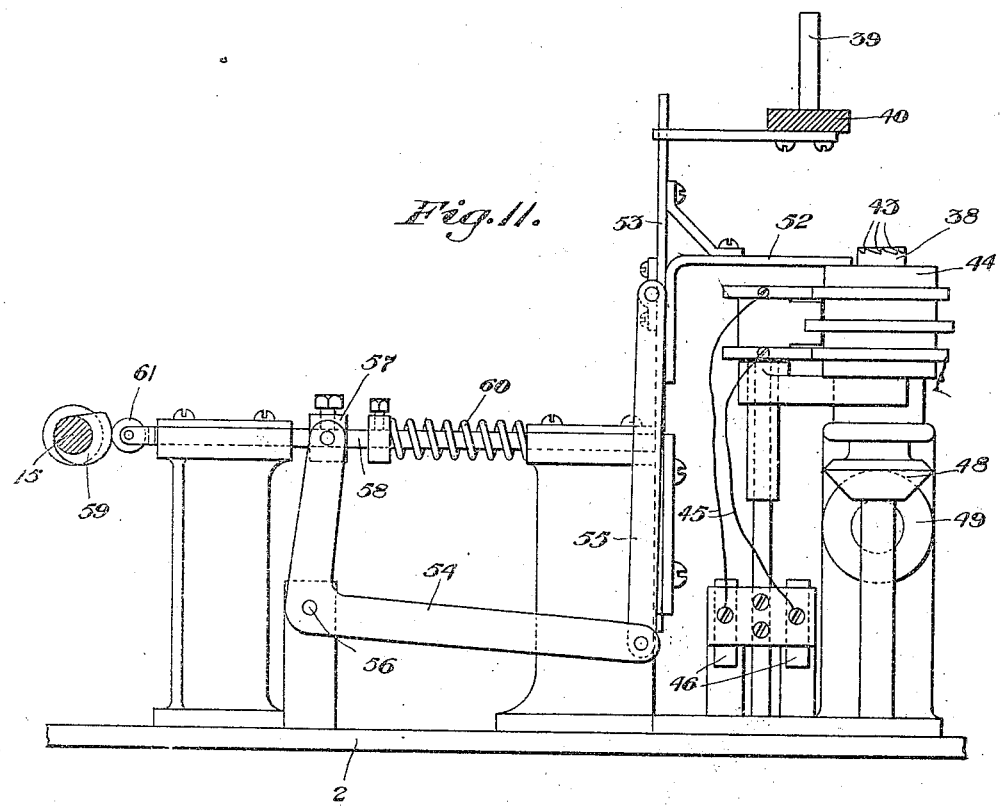
Figure 12:
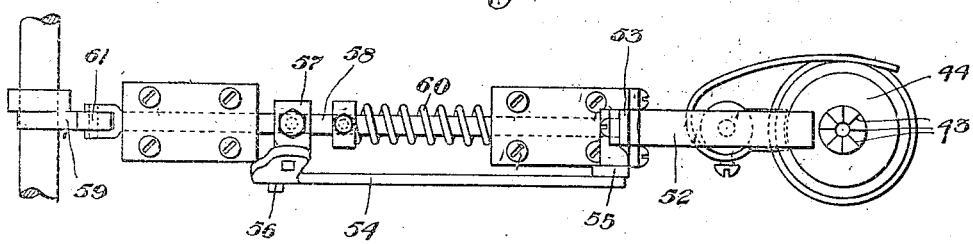

Figure 1 is a plan view of my improved molding apparatus for plastic material. Fig. 2 is a vertical section on the line II II of Fig. 1. Fig. 3 is a partial view of the apparatus, in side elevation, developed as though on a straight line. Fig. 4 is a partial similar view showing the spindle-rest lowered. Fig. 5 is a detail sectional view of the magnetic withdrawing device for the plunger. Fig. 6 is a plan view thereof. Fig. 7 is a detail view, in side elevation, of the electrical contacting devices for energizing the magnet. Fig. 8 is a partial detail view, in sectional elevation, of one of the rotating thread-forming spindles with its actuating star-wheel. Fig. 9 is a cross-sectional plan view on the line IX IX of Fig. 8. Fig. 10 is a detail of the lever for the spindle-support. Figs. 11 and 12 are detail views, enlarged, of the mechanism for lowering the magnetic clutch for the spindles.

My invention refers to improvements in apparatus for forming articles of plastic nature, as glass, and is particularly designed for the manufacture of insulators for telegraph or other wires.

The invention has in view the rapid economical manufacture of such devices of uniform character by means of mechanism adapted to press the article in suitable molds, together with a vertically-reciprocating threaded plunger adapted to be raised into suitable position and held there during the pressing operation and to be removed by unscrewing after the article is formed, so as to leave a threaded interior cavity and allow the finished insulator to be removed from the mold.

The present invention is similar in construction and mode of operation to that shown and described in my prior application, filed June 10, 1904, bearing the Serial No. 211,904, and refers more particularly to the mechanism for unscrewing the spindle, so as to provide for a gradual preliminary operation and a final rapid removing movement, as shall be more fully hereinafter described.

Referring now to the drawings illustrating the invention, 2 represents any suitable base, upon which the structure and operative elements comprising my invention are mounted. 3 is a ball-race mounted upon the structural framework 4, provided with an annular groove adapted to support a series of bearing-balls, as shown, upon which balls rests a turn-table 5, adapted to support and carry the molds. These molds are of the usual well-known construction, comprising a base-mold 6, upon which are mounted the hinged sides of divided molds 7, as will be readily understood, and these molds are adapted to be intermittently rotated around upon the carrier 5, so as to bring each mold successively beneath a pressing-plunger 8 at the proper place and time. The table 5 is intermittently actuated by means of a spring-controlled pawl or latch 9, mounted in the outer end of a swinging arm 10, actuated by pitman 11 from crank-disk 12 on the upper end of shaft 13, driven by gearing 14 from main shaft 15.

The operation of this construction will be readily understood from Figs. 1 and 2, and the turn-table is rotated thereby, the pressing operation being performed between each period of rest occurring during back travel of the pawl 9. The plunger 8 is also reciprocated and pressed downwardly into the mold 7 by means of a lever 17, connected with the stem 18 of plunger 8 by suitable links 19 and any convenient intervening cushioning device, as a spring 20. Lever 17 is pivoted at 21 on the upwardly-extending standard 22, which also provides a bearing for the plunger-rod, the lever extending backwardly and engaging by a terminal roller with the groove 23 of a cam 24, mounted on the upper end of a vertical shaft 25 and driven through gearing 26 on main shaft 15, as clearly shown in Fig. 2.

The exterior portions of the insulator are entirely formed by molds 6 and 7 and plunger 8, and for the purpose of providing the internally-threaded cavity of the insulator I provide a vertically-reciprocating plunger 27, having a threaded terminal 28, the lower portion of the plunger being vertically mounted in a bearing 29, depending downwardly from the lower portion of the turn-table. It will be understood that, as shown, each mold is provided with its coöperating plunger and that the plungers in their construction and operation are all the same. The plunger is ordinarily in its lowered position, as shown at the right of Fig. 3, at which point each plunger is vertically raised into the mold-cavity by means of an independent raising-spindle 34, which in turn is raised by a wiping-cam 35, mounted or secured upon a disk 36 at the outer end of shaft 15. This wiper-cam 35 is so arranged that it will gradually raise the lifting-stem 34, which abuts against the lower end of plunger 27, raising it to the desired height in the mold and there holding it until the turn-table is again intermittently actuated, when the plunger is carried around upon a receiving ledge or platform 30, mounted upon standards 31 and capable of being raised and lowered by a lever 32, pivotally attached at its inner end to any suitable bearing and adapted to be set to a raised or lowered position upon one or the other of supporting-shoulders 33 in a suitable standard with which the lever coöperates, as shown. The object of this mechanism is that the platform 30 may be normally held in the raised position to support the lower ends of the spindles, which in their subsequent travel around with the machine are unscrewed, as shall be hereinafter described, and for the purpose of providing a supporting-bearing for the lower ends of the spindles corresponding with their gradual lowering as unscrewed the platform 30 is inclined downwardly, terminating at or about the position where the spindles are located during the stationary period of the turn-table directly over an unscrewing spindle 38. Prior to the final unscrewing of the spindles from the molded article it is desirable that they shall remain in the molded article sufficiently long after the pressing operation to allow the glass to become hardened, so that the unscrewing of the spindle will not distort the article, and for this purpose the spindles are preferably maintained in a non-rotating position until they arrive at or about the point indicated by the letter A in Fig. 3.

For the purpose of slowly unscrewing the spindle from this point on I provide a series of pins or rack-abutments 39, mounted upon a suitable support 40, while each spindle is provided with a star-wheel 41 in ratchet engagement with the spindle, as shown in Figs. 8 and 9, whereby the star-wheel will act to rotate the plunger upon coming into contact with the pins 39, but will permit the plunger itself to be unscrewed independently of the star-wheel. For this final unscrewing I have provided the unscrewing spindle 38, vertically mounted in a suitable standard 42, located underneath the turn-table at the appropriate position and capable of an up-and-down movement therein. The spindle 38 is provided at its upper portion with teeth 43, adapted to engage corresponding teeth on the lower end of each spindle 27, while for the purpose of insuring a downward pull on spindle 27 I provide a magnet 44, adapted to be energized at the proper time through connections 45, which in the raised position of the spindle come into contact with terminals 46 of an energizing-current connected therewith from battery 47 or any suitable source of electric energy. Spindle 38 is constantly rotated by means of bevel-gearing 48 49, driven through sprocket-gearing 50 from the main shaft, as shown, bevel 48 being in spline engagement with spindle 38, so as to rotate at whatever vertical position it may assume. Normally spindle 38 is held raised by a counterweighted lever 51, engaging the spindle, as shown in Fig. 3, and for the purpose of depressing the rotating spindle 38 at the proper time, so as to compensate for the unscrewing downward motion of spindle 27, I provide the mechanism shown in detail in Figs. 11 and 12. This construction comprises a vertically-movable arm 52, extending over the top of magnet 44 or any suitable portion thereof or of spindle 38, said arm 52 extending outwardly form a vertically-reciprocating standard 53, mounted in suitable bearings on the machine.

Standard 53 is intermittently lowered by means of a bell-crank lever 54 through link 55, lever 54 being pivoted at 56, extending upwardly and engaging by a suitable collar 57 a horizontally-disposed shaft 58, which is normally projected backwardly against a cam 59, mounted on the main shaft 15 by means of a compression-spring 60, as shown. The inner end of shaft 58 is preferably provided with a roller 61, bearing against cam 59. By this construction as cam 59 rotates it intermittently lowers arm 52, depressing the rotating spindle 38 to a degree of downward travel corresponding with the movement of the spindle 27, and by means of this mechanism the threaded plunger is quickly lowered away from the finished article. In the further travel of the turn-table the threaded plungers will remain inoperative until again arriving at the pressing position, where they are again raised into the mold-cavity, as has been described, the operation being repeated for the next and following rotations of the table.

The operation of the apparatus will be readily understood from the foregoing description, and while the machine is particularly adapted to the manufacture of insulators it is obvious that other devices may be made of a similar nature, or it may be adapted to other forms wherein it is desirable to form a threaded cavity.

Changes and variations may be made in its design, construction, proportions, or various details by the skilled mechanic; but all such changes are to be considered as within the scope of the following claims.

What I claim is—

1. Apparatus for forming articles of glassware consisting of a rotatable mold-carrier provided with a circularly-arranged series of molds, a pressing-plunger arranged to coöperate with said molds in rotation, a series of oppositely-disposed threaded plungers mounted in the mold-carrier, an independent plunger-raising spindle, means for unscrewing the threaded plungers operated by rotation of the mold-carrier, and means for slidingly supporting the plungers, substantially as set forth.

2. Apparatus for forming articles of glassware consisting of a rotatable mold-carrier provided with a circularly-arranged series of molds, a pressing-plunger arranged to coöperate with said molds in rotation, a series of oppositely-disposed threaded plungers mounted in the mold-carrier, an independent plunger-raising spindle, means for unscrewing the threaded plungers operated by rotation of the mold-carrier, and vertically-adjustable means for slidingly supporting the plungers, substantially as set forth.

3. Apparatus for forming articles of glassware consisting of a rotatable mold-carrier provided with a circularly-arranged series of molds, a pressing-plunger arranged to coöperate with said molds in rotation, a series of oppositely-disposed threaded plungers mounted in the mold-carrier, an independent plunger-raising spindle, means for unscrewing the threaded plungers operated by rotation of the mold-carrier, and means for slidingly supporting the plungers, with means adapted to engage each spindle and to unscrew it finally from the mold during the stationary period thereof, substantially as set forth.

4. The combination with an intermittently-rotatable mold-carrier, a series of stationary abutments, and a series of vertically-arranged threaded plungers provided with devices adapted to engage said abutments to unscrew the plungers; of independent means adapted to engage each plunger and to finally unscrew it from the mold during the stationary period thereof, substantially as set forth.

5. The combination with an intermittently-rotatable mold-carrier, a series of stationary abutments, and a series of vertically-arranged threaded plungers provided with devices adapted to engage said abutments to unscrew the plungers, and having toothed extremities; of an independent vertically-movable spindle having a toothed extremity adapted to engage the lower end of each plunger and to finally unscrew it during the stationary period thereof, substantially as set forth.

6. The combination with a rotatable mold-carrier, a series of stationary abutments, and a series of vertically-arranged threaded plungers provided with devices adapted to engage said abutments to unscrew the plungers, and having toothed extremities; of an independent vertically-movable spindle having a toothed extremity adapted to engage the lower end of each plunger and to finally unscrew it during the stationary period thereof at an increased speed, substantially as set forth.

7. The combination with a threaded plunger provided with a toothed extremity; of a vertically-movable rotating spindle provided with a corresponding toothed extremity and an energizing-magnet, substantially as set forth.

8. The combination with a threaded plunger provided with a toothed extremity; of a vertically-movable rotating spindle provided with a corresponding toothed extremity and an energizing-magnet, with means adapted to energize said magnet and means to rotate it, substantially as set forth.

9. The combination with a series of fixed abutments and a rotating mold-carrier; of a threaded spindle extending into the mold-cavity, provided with a star-wheel arranged to engage said abutments and having ratchet mechanism permitting the spindle to be rotated independent of the star-wheel, substantially as set forth.

10. The combination with a series of fixed abutments and an intermittently-rotating mold-carrier; of a threaded spindle extending into the mold-cavity, provided with a star-wheel arranged to engage said abutments and having ratchet mechanism permitting the spindle to be rotated independent of the star-wheel, said spindle being provided with a toothed extremity; and independent means adapted to register with the spindle in its stationary position, and to rotate and finally remove it from the mold-cavity, substantially as set forth.

11. The combination with a rotatable mold-carrier, a series of threaded spindles therein, and means for gradually unscrewing said spindles; of a vertically-adjustable inclined shelf arranged to support said spindles and to permit of their gradual lowering travel, substantially as set forth.

12. The combination with a rotatable mold-carrier, a series of threaded spindles therein, and means for gradually unscrewing said spindles; of a vertically-adjustable inclined shelf arranged to support said spindles and to permit of their gradual lowering travel, with means arranged to raise each spindle above the level of said shelf, substantially as set forth.

In testimony whereof I affix my signature in presence of two witnesses.

JOHN H. CROSKEY.

Witnesses:
CHAS. S. LEPLEY,
C. M. CLARKE.